(12) United States Patent
Maki (10) Patent No.: US 10,876,192 B2
(45) Date of Patent: Dec. 29, 2020

(54) SEPARATOR PRODUCTION METHOD (71) Applicant: MITSUI HIGH-TEC, INC., Kitakyushu (JP)

(72) Inventor: Kiyohisa Maki, Kitakyushu (JP)

(73) Assignee: MITSUI HIGH-TEC, INC., Kitakyushi (JP)

(*) Notice: Subject to any disclaimer, the term of this patent is extended or adjusted under 35 U.S.C. 154(b) by 346 days.

(21) Appl. No.: 15/763,766

(22) PCT Filed: Aug. 15, 2016

(86) PCT No.: PCT/JP2016/073859
§ 371 (c)(1),
(2) Date: Mar. 27, 2018

(87) PCT Pub. No.: WO2017/056759
PCT Pub. Date: Apr. 6, 2017

(65) Prior Publication Data
US 2018/0223408 A1 Aug. 9, 2018

(30) Foreign Application Priority Data
Sep. 28, 2015 (JP) ................. 2015-189748

(51) Int. Cl.
C22F 1/18 (2006.01)
B21D 13/02 (2006.01)
(Continued)

(52) U.S. Cl.
CPC .............. *C22F 1/183* (2013.01); *B21D 13/02* (2013.01); *B30B 15/30* (2013.01); *C21D 9/46* (2013.01);
(Continued)

(58) Field of Classification Search
CPC ......... C22F 1/183; B21D 13/02; B30B 15/30; C21D 9/46; H01M 8/00
See application file for complete search history.

(56) References Cited

U.S. PATENT DOCUMENTS

2012/0161352 A1    6/2012  Yamamoto
2014/0087287 A1    3/2014  Suzuki et al.
2016/0074919 A1*   3/2016  Taguchi ............. H01M 8/0258
                                              72/352

FOREIGN PATENT DOCUMENTS

CN    102473930 A    5/2012
CN    103597641 A    2/2014
(Continued)

OTHER PUBLICATIONS

Davis et al ASM Handbook vol. 4, 1991 (Year: 1991).*
(Continued)

*Primary Examiner* — Christopher S Keesler
*Assistant Examiner* — Jiangtian Xu
(74) *Attorney, Agent, or Firm* — Sughrue Mion, PLLC (57) ABSTRACT A method of manufacturing a separator includes subjecting a metal thin sheet material to be transported to stepwise forming working at an identical location by a plurality of press machines having different working shapes and arranged sequentially from an upstream side to a downstream side in a transport direction of the metal thin sheet material to form a flow passage groove. The thin sheet material is subjected to annealing treatment in at least one space of spaces between the press machines arranged adjacent to each other in the transport direction of the thin sheet material.

10 Claims, 3 Drawing Sheets (51) Int. Cl.
   *B30B 15/30*  (2006.01)
   *H01M 8/0206*  (2016.01)
   *C21D 9/46*  (2006.01)
   *H01M 8/021*  (2016.01)

(52) U.S. Cl.
   CPC ......... *H01M 8/021* (2013.01); *H01M 8/0206* (2013.01); *C21D 2241/00* (2013.01)

(56) References Cited

FOREIGN PATENT DOCUMENTS

| | | |
|---|---|---|
| JP | 3-152962 A | 6/1991 |
| JP | 2002-313354 A | 10/2002 |
| JP | 2003-249238 A | 9/2003 |
| WO | 2014/188800 A1 | 11/2014 |

OTHER PUBLICATIONS

Search Report dated Oct. 11, 2016, issued by the International Searching Authority in counterpart International Patent Application No. PCT/JP2016/073859 (PCT/ISA/210).

Written Opinion dated Oct. 11, 2016, issued by the International Searching Authority in counterpart International Patent Application No. PCT/JP2016/073859 (PCT/ISA/237).

English translation of Written Opinion dated Oct. 11, 2016, issued by the International Searching Authority in counterpart International Patent Application No. PCT/JP2016/073859 (PCT/ISA/237).

Office Action dated Jun. 19, 2020 by the State Intellectual Property Office of P.R. China in counterpart Chinese Patent Application No. 201680056696.7.

\* cited by examiner

FIG.1

SEPARATOR PRODUCTION METHOD

TECHNICAL FIELD

The present invention relates to a method of manufacturing a separator used for a fuel cell.

BACKGROUND ART

In a metal separator used for a fuel cell, a flow passage groove for making gas flow is formed. A method of forming a flow passage groove in a metal thin sheet material using a press machine provided with a die having a male die and a female die which are opposed to each other and are made to imitate the shape of the flow passage groove has been widely known.

In forming a flow passage groove, it is reasonable for productivity to form the final shape of the flow passage groove on the thin sheet material at one time. However, for example, in a case where a flow passage groove is densely formed and further the shape thereof is complicated, the extension of the material cannot follows the shape to be formed, and the thin sheet material is likely to be broken.

Here, a method of performing stepwise forming to form the final shape is generally used in many cases. For example, Patent Literature 1 discloses a method of subjecting a thin sheet material (metal plate) to two-stage die forming to form a flow passage groove (groove portion) having both flat bottom and side surfaces.

In the method of subjecting the thin sheet material to stepwise forming to form a desired shape, hardening occurs in the material due to plastic deformation in each process and thus, there is a problem that the material is likely to be broken as the processes progress.

In order to solve the problem, it is proposed that the thin sheet material is subjected to annealing treatment to return the structure of the hardened material to the original state.

As general annealing treatment, for example, in a case of using a thin sheet material wound in a reel shape, a method of performing treatment by charging a plurality of reel-shaped thin sheet materials into a batch heating furnace in a state of being bundled has been known. In addition, in a case of a sheet-shaped thin sheet material, a method of performing treatment by charging a plurality of thin sheet materials into a batch heating furnace in a state in which the plurality of thin sheet materials are put in a rack has been known.

However, in the above described methods, every time the annealing treatment is performed, labor for wounding and bundling the thin sheet materials or storing the thin sheet materials in a rack is required.

In a case of subjecting the thin sheet material to annealing treatment using the batch heating furnace, due to a property that an arbitrary number of thin sheet materials are collectively subjected to annealing treatment, the thin sheet material cannot be charged into a heating furnace until the number of separators after press working reaches a predetermined number, and the time during which annealing equipment is in a standby state is generated. Thus, there is a high possibility of deterioration in productivity.

Here, Patent Literature 2 proposes a method of using an apparatus having a die provided with an annealing function therein.

CITATION LIST

Patent Literature

Patent Literature 1: JP-A-2003-249238
Patent Literature 2: WO 2014/188800

SUMMARY OF INVENTION

Technical Problem

In the method described in Patent Literature 2, however, since an annealing function is provided in the die, the temperature of the die or press machine inevitably rises. As a result, the accuracy of working performed before or after, or before and after an annealing process is affected to a considerable extent. In addition, since the effect of thermal expansion caused by the temperature rise is exerted on the thin sheet material as well as on the die and the press machines, there is a concern of causing remarkable deterioration in accuracy of positioning of the thin sheet material and the die and shape.

The present invention is made in consideration of the above circumstances, and an object thereof is to provide a method of manufacturing a separator capable of accurately manufacturing a separator having excellent quality.

Solution to Problem

A method of manufacturing a separator according to an aspect of the present invention in line with the above object includes subjecting a metal thin sheet material to be transported to stepwise forming working at an identical location by a plurality of press machines having different working shapes and arranged sequentially from an upstream side to a downstream side in a transport direction of the metal thin sheet material to form a flow passage groove, and the thin sheet material is subjected to annealing treatment in at least one space of spaces between the press machines arranged adjacent to each other in the transport direction of the thin sheet material.

The annealing treatment may be performed at least between the press machine arranged on the most upstream side and the press machine arranged on a downstream side adjacent to the press machine arranged on the most upstream side.

The annealing treatment may be performed under an oxygen-free or non-oxidizing gas atmosphere.

Cooling treatment may be performed on the thin sheet material after the annealing treatment.

Advantageous Effects of Invention

According to the method of manufacturing a separator according to the aspect of the present invention, it is possible to prevent the temperature of the die or the press machine from being increased since the thin sheet material is subjected to annealing treatment between the press machines arranged adjacent to each other in a transport direction of the thin sheet material. Accordingly, since deterioration in working accuracy and deterioration in accuracy of positioning and shape can be suppressed and further can be prevented when a flow passage groove is formed, it is possible to accurately manufacture a separator having excellent quality. The expression "between the press machines" means a space between the press machines outside the press machines.

DESCRIPTION OF EMBODIMENTS

Next, with reference to the accompanying drawings, descriptions will be given of embodiments of the present invention for understanding of the present invention.

Figure 1:
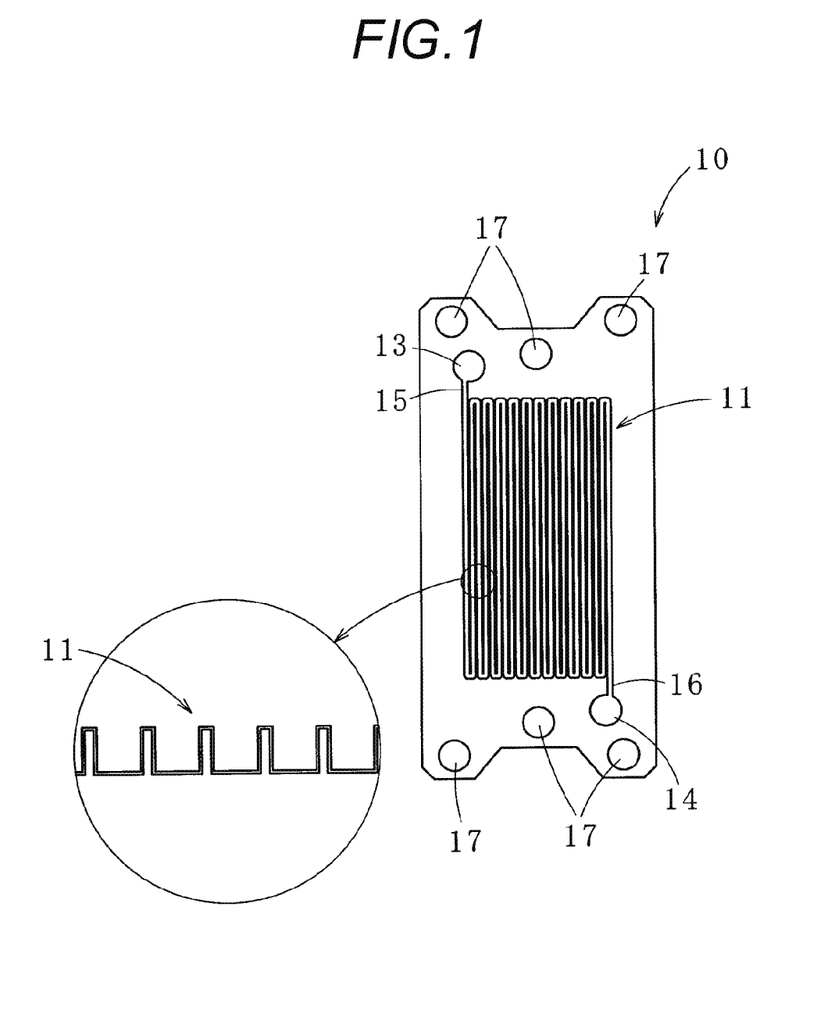
FIG. 1 is a top view of a separator manufactured by using a method of manufacturing a separator according to an embodiment of the present invention.

First, with reference to FIGS. 1 to 3, a separator 10 that is manufactured using a method of manufacturing a separator according to an embodiment of the present invention will be described. In FIG. 1, the cross-section of a flow passage groove 11 formed in the separator 10 is illustrated in an enlarged manner.

The separator 10 illustrated in FIG. 1 is used for a fuel cell in a state in which a plurality of layers of separators are laminated.

Figure 2:
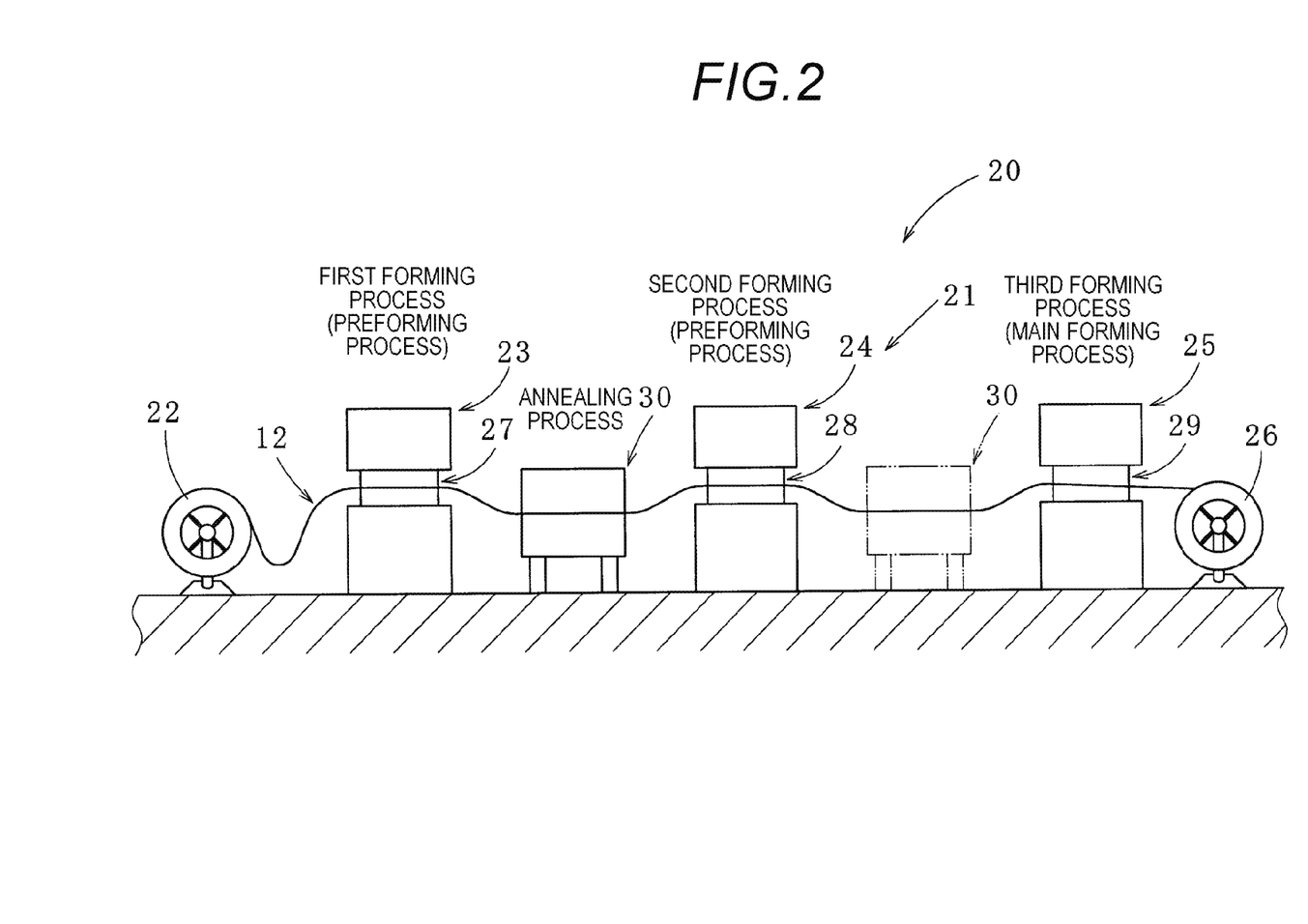
FIG. 2 is an explanatory diagram of the method of manufacturing the separator.
Figure 3:
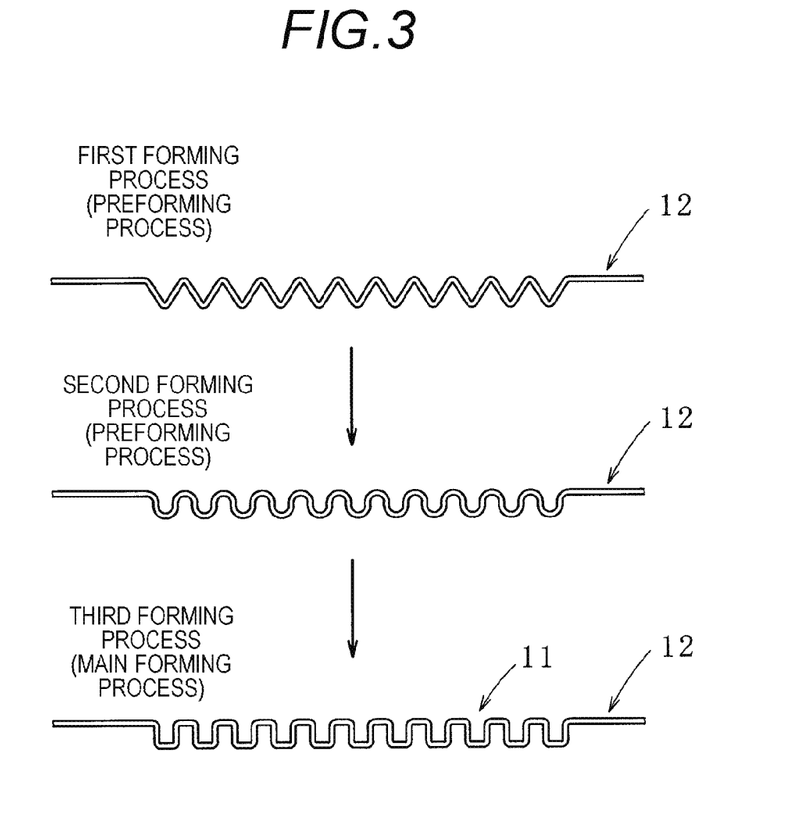
FIG. 3 is an explanatory diagram illustrating processes of forming a flow passage groove in the separator by the method of manufacturing the separator.

As illustrated in FIG. 2, the separator 10 is formed by subjecting a metal thin sheet material 12 having a thickness of, for example, about 0.1 mm or more and 0.7 mm or less to forming working (unevenness working) and then punching the metal thin sheet material 12. The metal thin sheet material 12 is, for example, a stainless steel sheet or a titanium sheet. The material and thickness of the metal thin sheet material are not particularly limited and can be variously changed according to the kind of the fuel cell, for example. As the metal thin sheet material, for example, a plated thin sheet material, a laminate formed by laminating a plurality of thin sheet materials (clad material), or the like can be used.

In the central region of the separator 10 excluding the periphery thereof, a flow passage groove 11 with a recessed cross-section is folded back at a predetermined length by forming working and is formed in a zigzag shape.

In the example illustrated in the drawing, a hydrogen or oxygen supply hole 13 is formed on one end side (left upper side) of this continuous flow passage groove 11. On the other end side (right lower side) of the continuous flow passage groove 11, a hydrogen or oxygen supply hole 14 is formed. One end portion (upper end portion) of the flow passage groove 11 and one supply hole 13 are connected by an extension groove 15. The other end portion (lower end portion) of the flow passage groove 11 and the other supply hole 14 are connected by an extension groove 16.

The shape of the separator is also not particularly limited and can be variously changed according to the kind of the fuel cell, for example. For example, as illustrated in FIGS. 1 and 3, in the cross-section of the flow passage groove 11, a rectangular, square, or trapezoidal shape having a cross-sectional shape in which the bottom surface and the side surface thereof are flat may be used or a cross-section circular arc shape may be used. In addition, the depth of the flow passage groove 11 is, for example, about 0.5 mm or more and 1 mm or less. The depth of the flow passage groove 11 may be less than 0.5 mm or may be more than 1 mm. However, as the groove becomes deeper, the material is more likely to be broken, and thus the effects of the present invention become more remarkable.

The reference numeral "17" in FIG. 1 denotes through holes used for laminating and fixing a plurality of separators 10 when the separators 10 are used for a fuel cell.

Next, separator manufacturing equipment (hereinafter, simply referred to as manufacturing equipment) 20 to which the method of manufacturing a separator according to the embodiment of the present invention is applied will be described with reference to FIGS. 2 and 3.

The manufacturing equipment 20 includes a pilot hole punching apparatus (not illustrated) which forms a pilot hole in the thin sheet material 12, a flow passage groove forming apparatus 21 which forms the flow passage groove 11 in the thin sheet material 12 in which a pilot hole is formed, and an outer peripheral punching apparatus (not illustrated) which punches and forms a portion corresponding to the separator 10 from the thin sheet material 12 in which the flow passage groove 11 is formed. Hereinafter, the details thereof will be described.

The pilot hole punching apparatus includes a die for forming circular pilot holes on both sides of the thin sheet material 12 in a width direction. The pilot hole punching apparatus forms pilot holes in the thin sheet material 12 at a predetermined pitch in a transport direction of the thin sheet material 12. Here, the predetermined pitch is not particularly limited, but the predetermined pitch is wider than the transverse width of the separator 10 punched from the thin sheet material 12. In addition, the pitch for providing the pilot hole can be set to 1.1 times or more to 1.3 times or less the transverse width of the separator 10 to be punched.

Slits can be formed around the pilot holes and thus it is possible to suppress and further prevent the effect of strain or deformation generated at the time of forming working (press working) by the flow passage groove forming apparatus 21 on the pilot holes.

The outer peripheral punching apparatus includes a die for punching and forming a portion corresponding to the separator 10 from the thin sheet material 12 in which the flow passage groove 11 is formed.

As illustrated in FIG. 2, the flow passage groove forming apparatus 21 includes an unwinding machine 22 which unwinds the thin sheet material 12 wound in a reel shape after the pilot holes are formed, two preforming press machines (an example of press machines) 23 and 24 which are sequentially arranged (arranged in series) in the transport direction of the thin sheet material 12 and preform forming working (performs unevenness working) for forming the flow passage groove 11, a main forming press machine (an example of a press machine) 25, and a winding machine 26 which winds the thin sheet material 12 in which the flow passage groove 11 is formed in a reel shape.

Hereinafter, the preforming press machines 23 and 24 and the main forming press machine 25 will be described with reference to FIGS. 2 and 3.

The preforming press machines 23 and 24 and the main forming press machine 25 are sequentially arranged from the upstream side to the downstream side in the transport direction of the thin sheet material 12. In FIG. 2, the transport direction is a direction from the left side to the right side. The preforming press machines 23 and 24 and the main forming press machine 25 include dies having different working shapes from each other. The preforming press machines 23 and 24 and the main forming press machine 25 perform stepwise forming working at an identical location on the thin sheet material 12 to be transported (a region where the flow passage groove 11 is formed) to form the flow passage groove 11.

Specifically, the preforming press machine 23 arranged at the most upstream position includes a die 27 having a male die and a female die which are opposed to each other and are capable of performing forming working with a wavy cross-section in a region where the flow passage groove 11 is formed. The preforming press machine 24 arranged at the immediately downstream position of the preforming press machine 23 includes a die 28 having a male die and a female die which are opposed to each other and are capable of performing forming working for widening the bottom and upper portions of the wavy portion in the region worked into a wavy cross-section by the preforming press machine 23.

The main forming press machine 25 arranged on the downstream side of the preforming press machines 23 and 24 includes a die 29 having a male die and a female die which are opposed to each other and are capable of performing forming working for forming the final shape (a shape in which the bottom surface and the side surface are flat) in the region where forming working is performed by the preforming press machines 23 and 24.

Each configuration of the preforming press machines 23 and 24 and the main forming press machine 25 is not particularly limited as long as the configuration is capable of performing forming working on the thin sheet material 12. For example, an apparatus described in JP-A-2015-42418 can be used.

The preforming press machine 23 may include a single die 27 and to perform forming working with a wavy cross-section on the thin sheet material 12 only once. Alternatively, the preforming press machine 23 may include a plurality of dies 27 and to perform plural times of forming working for the whole preforming press machine 23 by pressing the plurality of dies 27 against the thin sheet material 12 each time. In a case where the preforming press machine includes the plurality of dies 27, multiple times of forming working can be performed with one press machine.

The preforming press machine 24 and the main forming press machine 25 may also include a plurality of dies and to perform multiple times of forming working with one press machine.

As illustrated in FIG. 2, an annealing unit 30 is provided between the preforming press machine 23 and the preforming press machine 24 arranged adjacent to each other in the transport direction of the thin sheet material 12. The annealing unit 30 is installed outside the preforming press machines 23 and 24.

The annealing unit 30 returns the structure of the working hardened material due to forming working of the preforming press machine 23 to the original state. Specifically, the annealing unit 30 heats only the region which is subjected to forming working or the entire thin sheet material 12 including the region.

As described above, the annealing unit 30 is provided between the preforming press machines 23 and 24 arranged adjacent to each other in the transport direction of the thin sheet material 12. Since the effect of hardening generated in the thin sheet material 12 worked with the preforming press machine 23 is reduced by the annealing unit 30, even in a case of performing working at the identical location on the thin sheet material 12 on the downstream side in the transport direction thereof, the thin sheet material 12 is less likely to be broken.

The amount of forming working (the amount of stretching) by the press machine arranged on the most upstream side is largest and the effect of hardening according to the amount of forming is maximized. In the embodiment, the annealing unit 30 is arranged between the press machine 23 arranged on the most upstream side and the press machine 24 arranged on the downstream side of the press machine 23 to be adjacent to each other. Since a location in which the effect of hardening is greatest is annealed by the annealing unit 30 and the metal structure is returned to the original state, it is possible to effectively reduce and prevent breakage from occurring in the following process.

In the embodiment, an example in which the annealing unit 30 is provided only between the preforming press machine 23 and the preforming press machine 24 is described. However, the annealing unit 30 may be further arranged between the preforming press machine 24 and the main forming press machine 25 in order to further improve product quality. The annealing unit 30 may be arranged between all of the press machines 23, 24, and 25.

The above-described annealing unit 30 only has to include a heating source capable of heating a region to be worked in the thin sheet material 12 to a preset temperature (a temperature at which hardening can be released), and as the method therefor, for example, heating using laser (laser heating), induction heating using a coil, and the like can be used.

Since the laser heating can heat the thin sheet material 12 to a preset temperature for a short period of time, for example, in a case where the time required for pressing of the preforming press machine 23 (the same is applied to the preforming press machine 24 and the main forming press machine 25) is preferably 10 seconds or shorter (preferably 6 seconds or shorter and more preferably 3 seconds or shorter), the laser heating is suitable for heating the thin sheet material 12. In addition, since local (partial) heating is possible, the effect of heating with respect to the entire thin sheet material 12 can be reduced and thus the laser heating is suitable for heating the thin sheet material 12.

The induction heating can be performed with, for example, a heating furnace provided with a coil arranged therein. The thin sheet material 12 can be heated by transporting the thin sheet material 12 into the heating furnace.

The induction heating requires the time for heating the thin sheet material 12 to a preset temperature compared to the above-described laser heating. Therefore, for example, in a case where the pressing time of the preforming press machine 23 (the same is applied to the preforming press machine 24 and the main forming press machine 25) requires about 30 seconds or longer and 2 minutes or shorter (herein, about 1 minute) to prevent breakage of the material, the heating time can be sufficiently secured. Thus, the thin sheet material 12 can be heated to a preset heating temperature without excessively extending the length of the heating furnace.

The annealing treatment by the above-described annealing unit 30 may be performed in the air but is preferably performed under an oxygen-free or non-oxidizing gas atmosphere.

Here, the term "oxygen-free" means, for example, a vacuum state and the term "non-oxidizing gas" means a nitrogen gas or an inert gas (for example, Ar gas).

Thus, the oxidation of the thin sheet material 12 at the time of annealing treatment can be reduced and further prevented.

In a case where the thin sheet material 12 is transported to the preforming press machine 24 and subjected to forming working in a state in which the temperature of the annealed thin sheet material 12 is not sufficiently lowered, due to the thermal expansion of the thin sheet material 12, there is a concern of causing deterioration in accuracy of positioning of the thin sheet material 12 and the preforming press machine 24 and shape.

Therefore, the temperature of the thin sheet material 12 is preferably lowered until the annealed thin sheet material 12 is transported to the preforming press machine 24.

Since the thin sheet material 12 has a small thermal capacity, the temperature of the thin sheet material 12 may be lowered by natural cooling. In a case where a distance between the annealing unit 30 and the preforming press machine 24 is set to be longer than a distance between the preforming press machine 23 and the annealing unit 30, the time for natural cooling is likely to be secured and the temperature of the thin sheet material 12 is likely to be sufficiently lowered until the thin sheet material is transported to the preforming press machine 24.

Alternatively in a case where the temperature of the thin sheet material 12 is not sufficiently lowered by natural cooling, the thin sheet material 12 may be cooled by a cooling tool, such as a blower, provided on the downstream side of the annealing unit 30.

Subsequently, the method of manufacturing a separator according to the embodiment of the present invention will be described with reference to FIGS. 2 and 3.

The method of manufacturing a separator includes a pilot hole punching process of forming pilot holes in the thin sheet material 12 (not illustrated), and first and second forming processes (preforming process) and a third forming process (main forming process) of forming the flow passage groove 11 in the thin sheet material 12 in which the pilot holes are formed, an annealing process of performing annealing treatment on the thin sheet material 12 between these processes, and an outer peripheral punching process (not illustrated) of punching and forming a portion corresponding to the separator 10 from the thin sheet material 12 in which the flow passage groove 11 is formed. Hereinafter, the details thereof will be described.

(Pilot Hole Punching Process)

Circular pilot holes are formed on both sides of the thin sheet material 12 in the width direction by using the pilot hole punching apparatus. The pilot holes are formed at a predetermined pitch in the transport direction of the thin sheet material 12. In this process, it is preferable to form slits around the pilot holes.

Since the thin sheet material 12 in which the pilot holes are formed is wounded in a reel shape, the reeled thin sheet material 12 is set in the unwinding machine 22, and the unwound thin sheet material 12 is allowed to sequentially pass through the preforming press machine 23, the annealing unit 30, the preforming press machine 24, and the main forming press machine 25 and wounded in a reel shape by the winding machine 26.

(First Forming Process)

The thin sheet material 12 wounded in a reel shape after the pilot holes are formed is transported in the transport direction using the unwinding machine 22 and the winding machine 26 and a portion corresponding to the separator 10 punched from the thin sheet material 12 is moved to the preforming press machine 23.

Forming working with a wavy cross-section is performed in a region where the flow passage groove 11 is formed using the preforming press machine 23.

(Annealing Process)

The thin sheet material 12 is transported using the unwinding machine 22 and the winding machine 26 and the region having a wavy cross-section formed by the preforming press machine 23 is moved to the annealing unit 30.

The thin sheet material 12 is heated to a preset temperature (a temperature at which hardening can be released) using the annealing unit 30, and the structure of the hardened material due to forming working of the preforming press machine 23 is returned to the original state. The heating temperature of the thin sheet material 12 by the annealing unit 30 variously changes depending on the material of the thin sheet material 12 or the like, but in a case where the thin sheet material 12 is a titanium sheet, for example, the heating temperature is about 600° C. or higher and 700° C. or lower.

The annealing treatment by the annealing unit 30 may be performed in the air but is preferably performed under an oxygen-free (vacuum state) or non-oxidizing gas atmosphere.

After the annealing treatment, the thin sheet material 12 is transported using the unwinding machine 22 and the winding machine 26 and the region where the annealing treatment is performed is moved to the cooling tool so that the thin sheet material can be subjected to cooling treatment.

The temperature of the thin sheet material 12 is lowered to, for example, about 200° C. or lower (preferably 100° C. or lower) by the cooling treatment. However, since the thin sheet material 12 has a small thermal capacity, the thin sheet material may be naturally cooled without performing cooling treatment using the cooling tool.

(Second Forming Process)

The thin sheet material 12 is transported using the unwinding machine 22 and the winding machine 26 and the region having a wavy cross-section formed by the preforming press machine 23 (the region where annealing treatment is not performed) is moved to the preforming press machine 24.

Forming working for widening the bottom portion and the upper portion of the wavy portion is performed in the region having a wavy cross-section formed by the preforming press machine 23 by using the preforming press machine 24.

(Third Forming Process)

The thin sheet material 12 is transported using the unwinding machine 22 and the winding machine 26 and the region where forming working is performed by the preforming press machines 23 and 24 is moved to the main forming press machine 25.

The region where forming working is performed by the preforming press machines 23 and 24 is subjected to forming working into the final shape (a shape in which the bottom surface and the side surface are flat) using the main forming press machine 25.

Thus, the flow passage groove 11 can be formed in a portion corresponding to the separator 10 punched from the thin sheet material 12.

The flow passage groove 11 is formed in the thin sheet material 12 by performing each process described above and then the thin sheet material 12 is wound in a reel shape by the winding machine 26.

The annealing process is performed between the first forming process and the second forming process. However, the annealing process may be performed not only between the first forming process and the second forming process, but also between the second forming process and the third forming process. Further, the annealing process may be performed on the downstream side from the third forming process (before the thin sheet material is wound by the winding machine 26). The cooling treatment after the annealing treatment may be performed after each annealing treatment in the same manner.

(Outer Peripheral Punching Process)

The thin sheet material 12 which is wound in a reel shape after the flow passage groove 11 is formed is unwound and transported and a portion corresponding to the separator 10 punched from the thin sheet material 12 is moved to the outer peripheral punching apparatus.

A portion corresponding to the separator 10 is punched from the thin sheet material 12 in which the flow passage groove 11 is formed by using the outer peripheral punching apparatus. The thin sheet material 12 from which the separator 10 is punched is discarded, for example, after the thin sheet material is wound in a reel shape or is diced and treated as scrap.

A plurality of separators 10 obtained by the above method is laminated and fixed to be used for a fuel cell.

According to the method of manufacturing a separator according to the embodiment, the temperature of the die or the press machines can be prevented from being increased by performing the annealing treatment on the thin sheet material outside the press machines. Thus, in forming the flow passage groove, deterioration in working accuracy and deterioration in accuracy of positioning and shape can be reduced and further can be prevented and thus, it is possible to accurately manufacture a separator having excellent quality.

Since the respective treatments of the first forming process, the annealing process, the second forming process, and the third forming process described above are performed while the thin sheet material 12 is being transported in a reel to reel system, continuous treatment can be performed and productivity and workability improvement is facilitated. In addition, the equipment structure can be simplified and the equipment cost can be reduced.

Further, since the annealing treatment is performed in a limited space between, for example, the first forming process and the second forming process, for example, compared to a case where the entire thin sheet material is charged into the batch heating furnace as it is and is subjected to annealing treatment, the region to be subjected to annealing treatment can be narrowed at one time. Therefore, for example, in the separator manufacturing equipment, the amount of defective products formed when troubles and the like are generated can be reduced.

Although the present invention has been described heretofore with reference to the embodiments, the present invention is not limited to the structure described in the above embodiments but contains other embodiments and modifications falling within the items described in the scope of the present disclosure. For example, in a case where the above-described respective embodiments and modifications can be partially or wholly combined together to constitute the method of manufacturing a separator of the present invention, such a method is included fall in the scope of the rights of the present invention.

In the above embodiments, a case where two preforming press machines on the upstream side of the main forming press machine (a total of three press machines) are arranged has been described. However, the present invention is not limited thereto and the following embodiment can be adopted.

For example, one preforming press machine may be arranged on the upstream side of one main forming press machine (a total of two press machines). In this case, the thin sheet material is subjected to annealing treatment between the preforming press machine and the main forming press machine.

In order to prevent the material from being broken, for example, three or more preforming press machines may be arranged on the upstream side of the main forming press machine (a total of four or more press machines) according to the material and thickness of the thin sheet material. In this case, thin sheet material can be subjected to annealing treatment in at least one space of spaces between the press machines adjacent to each other.

Further, the thin sheet material may be subjected to annealing treatment or cooling treatment after the annealing treatment on the downstream side from the main forming press machine (before the thin sheet material is wound).

In the above embodiments, a case where the thin sheet material which is wound in a reel shape after the pilot holes are formed is unwound and transported by the unwinding machine and the winding machine to form the flow passage groove by the plurality of press machines, that is, a case where the flow passage groove is formed separately from pilot hole formation and outer peripheral punching has been described. However, pilot hole formation, flow passage groove formation, and outer peripheral punching can be continuously performed and it is preferable to continuously perform such processes from the viewpoint of productivity.

This application is based on the Japanese patent application No. 2015-189748 filed on Sep. 28, 2015, the contents of which are incorporated herein by reference.

INDUSTRIAL APPLICABILITY

In the method of manufacturing a separator according to the present invention, since the thin sheet material is subjected to annealing treatment between the press machines adjacent to each other in the transport direction of the thin sheet material, it is possible to prevent the temperature of the die or the press machines from being increased. Thus, in forming the flow passage groove, deterioration in working accuracy and deterioration in accuracy of positioning and shape can be suppressed and further can be prevented and thus, it is possible to accurately manufacture a separator having excellent quality.

REFERENCE SIGNS LIST

10: Separator
11: Flow passage groove
12: Thin sheet material
13, 14: Supply hole
15, 16: Extension groove
17: Through hole
20: Separator manufacturing equipment
21: Flow passage groove forming apparatus
22: Unwinding machine
23, 24: Preforming press machine (press machine)
25: Main forming press machine (press machine)
26: Winding machine
27 to 29: Die
30: Annealing unit

The invention claimed is:

1. A method of manufacturing a separator comprising:
subjecting a thin metal sheet to stepwise forming working at a first location on the thin metal sheet by transporting the thin metal sheet through a plurality of press machines having different working shapes and arranged sequentially from an upstream side to a downstream side in a transport direction to form a flow passage groove, each press machine forming a portion at a same location on the thin metal sheet, and annealing the thin metal sheet as the thin metal sheet passes through a space between neighboring press machines.

2. The method of manufacturing the separator according to claim 1, wherein the annealing is performed on the first location on the thin metal sheet after the first location on the thin metal sheet has been formed by a press machine arranged on a most upstream side and before the first location on the thin metal sheet has been formed by a neighboring press machine arranged on a downstream side of the press machine arranged on the most upstream side.

3. The method of manufacturing the separator according to claim 1, wherein the annealing is performed under an oxygen-free or non-oxidizing gas atmosphere.

4. The method of manufacturing the separator according to claim 1, wherein the thin metal sheet is cooled by a cooling tool after the annealing.

5. The method of manufacturing the separator according to claim 1, wherein, after the first location is formed, the first location is annealed before being formed for a second time.

6. A method of manufacturing a separator comprising:
transporting a metal sheet sequentially through a plurality of press machines beginning with an upstream press machine and ending with a downstream press machine, wherein each press machine forms same portions of the metal sheet as the metal sheet is transported through the plurality of press machines; and
heating each formed portion to an annealing temperature after each formed portion has been formed by the upstream press machine and before each formed portion has been formed by the downstream pressing machine.

7. The method of manufacturing the separator according to claim 6, wherein each formed portion is heated after exiting the upstream press machine and before entering a pressing machine immediately downstream of the upstream pressing machine.

8. The method of manufacturing the separator according to claim 6, wherein, after each time a portion is formed, the formed portion is annealed before being formed again.

9. The method of manufacturing the separator according to claim 6, wherein the metal sheet passes through an annealing machine as the metal sheet is transported between neighboring press machines of the plurality of press machines.

10. The method of manufacturing the separator according to claim 6, wherein only the formed portion is annealed.

* * * * *